United States Patent
Kim et al.

(10) Patent No.: US 7,128,863 B2
(45) Date of Patent: Oct. 31, 2006

(54) HEAT-SHRINKABLE POLYESTER FILM HAVING EXCELLENT CRYSTALLINITY

(75) Inventors: Sang-Pil Kim, Kyungsangbuk-do (KR); Byung-Sik Park, Kyungsangbuk-do (KR); Gi-Jeong Moon, Daegu-si (KR); Sang-Duk Oh, Kyungsangbuk-do (KR); Jung-Won Kim, Kyungsangbuk-do (KR)

(73) Assignee: Toray Saehan Inc., Gumi (KR)

( * ) Notice: Subject to any disclaimer, the term of this patent is extended or adjusted under 35 U.S.C. 154(b) by 133 days.

(21) Appl. No.: 10/873,625

(22) Filed: Jun. 23, 2004

(65) Prior Publication Data

US 2005/0010018 A1     Jan. 13, 2005

(30) Foreign Application Priority Data

Jun. 23, 2003 (KR) ............. 10-2003-0040725

(51) Int. Cl.
*D01D 5/12* (2006.01)
*C08F 20/00* (2006.01)

(52) U.S. Cl. ............ 264/210.8; 528/307; 528/308.6; 525/437; 525/444; 428/221

(58) Field of Classification Search ............. 528/307, 528/308.6; 428/221; 264/210.8; 525/437, 525/444
See application file for complete search history.

(56) References Cited

U.S. PATENT DOCUMENTS

2004/0180229 A1* 9/2004 Hayakawa et al. ......... 428/480

* cited by examiner

*Primary Examiner*—Samuel A. Acquah
(74) *Attorney, Agent, or Firm*—Arent Fox PLLC

(57) ABSTRACT

Disclosed herein is a heat-shrinkable co-polyester film having terephthalic acid and ethylene glycol as main components and containing 1,4-cyclohexanedimethanol at the amount of 3–40 mol %. The heat-shrinkable co-polyester film has a crystallization temperature of 80–220° C., a heat shrinkage (%) higher than 30% in at least one direction of longitudinal and transverse directions in 90° C. hot water, and a maximum shrinkage stress lower than 3 kg/mm$^2$. The film is suitable for use as various wrapping materials, such as covering, binding and casing materials. Particularly, the film is used to cover a cap, body and shoulder, etc. of various vessels and rod-shaped molded articles and thus to provide labeling, protection, binding or an improvement in product value. Also, the film can be used for multi-package.

1 Claim, 1 Drawing Sheet

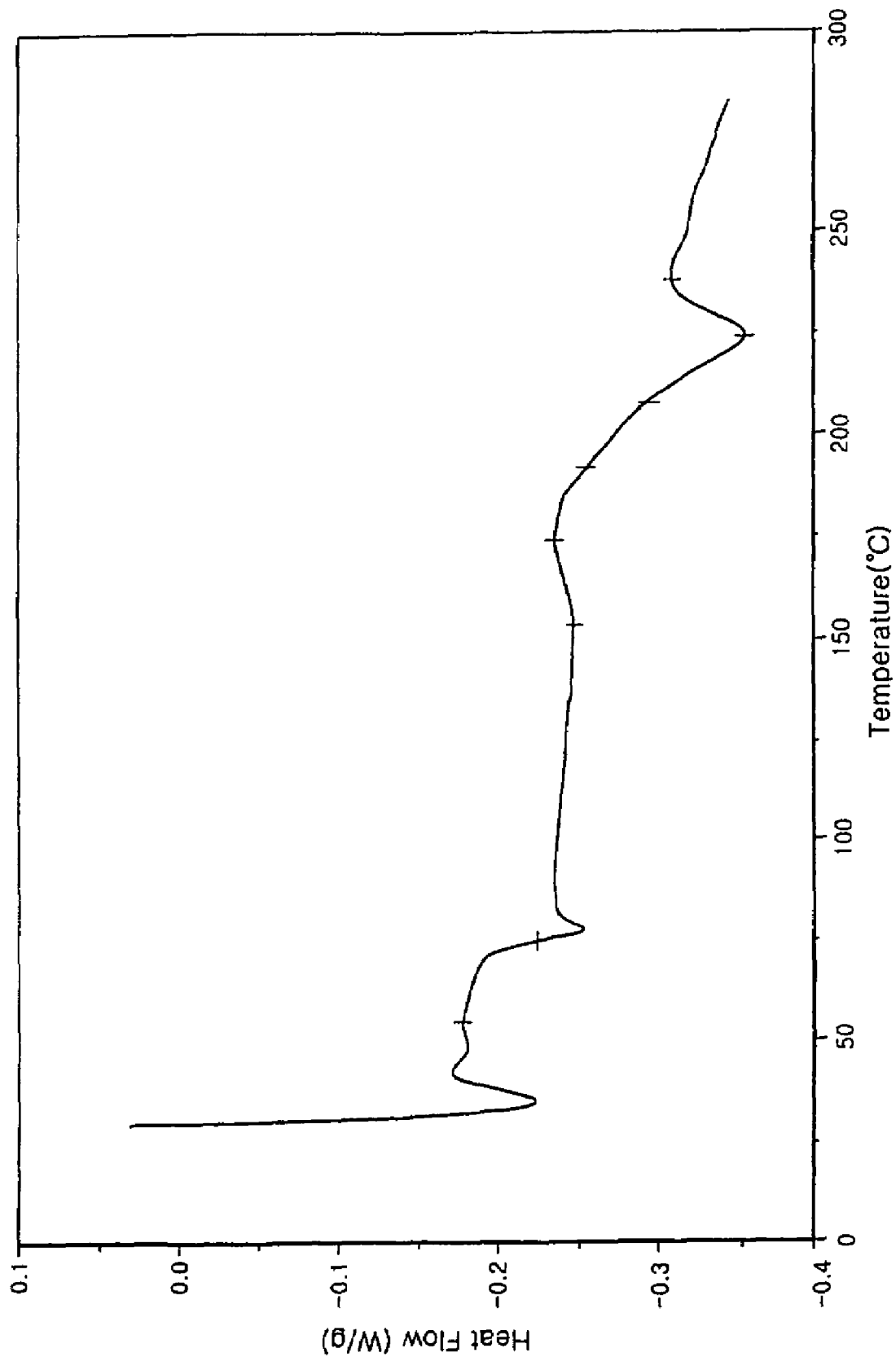

HEAT-SHRINKABLE POLYESTER FILM HAVING EXCELLENT CRYSTALLINITY

BACKGROUND OF THE INVENTION

1. Field of the Invention

The present invention relates to a heat-shrinkable polyester film, which simultaneously overcomes the problem of difficult pre-crystallization occurring at a neopentylglycol content larger than 25 mol %, the product and process problems caused by thermal decomposition upon recycling, and various problems according to aging occurring upon long-term storage.

2. Background of the Related Art

A heat-shrinkable film is used for the covering, binding or casing of vessels, plastic bottles, glass bottles, and various rod-shaped molded parts, such as pipes, rods and woods, and particularly, used to cover a cap, body and shoulder, etc. of such articles and thus to provide labeling, protection, binding or an improvement in product value. Moreover, this is widely used for the multi-package of products, such as boxes, bottles, sheets, rods and notes, etc., and expected to find use in various applications in view of its shrinkability and shrinkage stress.

In the prior art, a heat-shrinkable film of polyvinyl chloride, polystyrene or polypropylene, etc. was covered on the vessels in a tube shape, multi-packaged and thermally shrunk. However, such a heat-shrinkable film is disadvantageous in that it has insufficient heat resistance, chemical resistance and weather resistance and thus tends to melt or tear upon boiling or retort treatment.

Particularly, the heat-shrinkable film of polyvinyl chloride contains chlorine so that it produces dioxins upon incineration to cause an environmental problem. The heat-shrinkable film of polystyrene has high natural shrinkage (%) and thus the poor printability and storage problems caused by a change in its dimension upon storage and printing.

In the prior art regarding the heat-shrinkable polyester film, Korean patent laid-open publication No. 2001-11259 discloses a method of producing a co-polyester film by blending polyethylene terephthalate, polytrimethylene terephthalate and neopentylglycol co-polyester. However, this heat-shrinkable polyester film has several problems as follows. First, if the neopentylglycon co-polyester contains neopentylglycol at an amount larger than 25 mol %, this will be difficult to be pre-crystallized. The second problem is that this heat-shrinkable film is thermally decomposed upon recycling to cause a process problem, since it has a far lower melting point than a polyethylene terephthalate film. The third problem is that this heat-shrinkable film is aged upon long-term storage, since it has non-crystallinity unlike a heat-shrinkable polyester film of the present invention.

SUMMARY OF THE INVENTION

Accordingly, an object of the present invention is to provide a heat-shrinkable polyester film, which simultaneously overcomes the problem of difficult pre-crystallization occurring at a neopentylglycol content larger than 25 mol %, the product and process problems caused by thermal decomposition upon recycling, and various problems according to aging occurring upon long-term storage.

To achieve the above object, the present invention provides a heat-shrinkable co-polyester film having terephthalic acid and ethylene glycol as main components and containing 1,4-cyclohexanedimethanol at the amount of 3–40 mol %, in which the co-polyester film has a crystallization temperature of 80–220° C., a heat shrinkage (%) higher than 30% in at least one direction of longitudinal and transverse directions in 90° C. hot water, and a maximum shrinkage stress lower than 3 kg/mm$^2$.

When the heat-shrinkable polyester film according to the present invention is used for the covering or labeling of vessels, it has no defects, such as end folding, shrinkage marks, post-shrinkage folding, distortion, and end lifting, owing to reduced shrinkage rate.

BRIEF DESCRIPTION OF THE DRAWINGS

FIG. 1 shows the result of differential scanning calorimetry (DSC) for a heat-shrinkable polyester film produced in Example 1.

DETAILED DESCRIPTION OF THE PREFERRED EMBODIMENT

The present invention provides a heat-shrinkable co-polyester film having terephthalic acid and ethylene glycol as main components and containing 1,4-cyclohexanedimethanol at the amount of 3–40 mol %. The heat-shrinkable co-polyester film according to the present invention has a crystallization temperature of 80–220° C., a heat shrinkage (%) higher than 30% in at least one direction of longitudinal and transverse directions in 90° C. hot water, and a maximum shrinkage stress lower than 3 kg/mm$^2$.

According to the present invention, 1,4-cyclohexanedimethanol co-polyester (PETG) and polyethylene terephthalate (PET), polybutylene terephthalate (PBT) or polypropylene terephthalate (PTT) are introduced into the respective raw material feeders without pre-drying or pre-crystallization. Then, while adjusting the inputs of the raw materials with the respective feeders, the raw materials introduced into a twin-screw extruder such that they can be melted and extruded with the removal of water in high vacuum levels. The resulting sheet melted and extruded through the twin screw-extruder and T-die is solidified in a chill casting roll, and the solidified sheet is drawn to 2–5 times in a longitudinal or transverse direction, thereby producing the heat-shrinkable polyester film of the present invention. In this producing method, there does not occur the problem of fusion even if the pre-crystallization of co-polyester is not carried out. Furthermore, the heat-shrinkable polyester film of the present invention has a melting point of 210–245° C. and thus an advantage in that the production of by-produces caused by thermal decomposition upon recycling can be further reduced.

For the recycling of a heat-shrinkable polyester film produced by the simple blending of polytrimethylene terephthalate, neopentylglycol co-polyester and polyethylene terephthalate as described in Korean patent laid-open publication No. 2001-11259, the solid film must be melted at high temperature and then formed into a chip shape. However, in this case, since the co-polyester forming the heat-shrinkable polyester film has slow crystallization rate, pre-drying must be conducted at low temperature for a considerable time or the twin-screw extruder must be used as in the present invention. On the other hand, according to the present invention, when the raw materials are introduced into the twin-screw extruder while adjusting their inputs to a suitable mixing ratio with the respective raw material feeders, the heat-shrinkable polyester film composition, which had been melted in the twin-screw extruder and then formed into a cooled sheet, has a crystallization rate faster than the film composition produced according to the prior art and thus more easily pre-dried. Moreover, crystalline polymer generally has excellent thermal stability as compared to non-crystalline polymer. The heat-shrinkable polyester film of the present invention shows the crystallization peak in a differential scanning calorimeter (DSC) whereas the prior heat-shrinkable polyester film does not show the crystallization peak in the same condition. Owing to this difference in crystallinity, the heat-shrinkable polyester film of the present invention has no problems according to aging even upon long-term storage.

In order to examine the thermal properties of the heat-shrinkable co-polyester film of the present invention, this co-polyester film was heated from 25° C. to 280° C. at a rate of 10° C./minute with a differential scanning calorimeter (DSC) to erase all the heat history of the co-polyester film, and then quenched to room temperature. The co-polyester film was heated again from 25° C. to 280° C. at a rate of 10° C./minute, and at the same time, analyzed for its intrinsic thermal properties. In this case, the heat-shrinkable polyester film has a crystallization temperature (Tc) of 80–220° C., and preferably 100–200° C. If the crystallization temperature is below 80° C., the low temperature shrinkage (%) of the resulting heat-shrinkable polyester film will be reduced. If the crystallization temperature is above 220° C., the crystallization rate of the resulting film will be slow.

The heat-shrinkable co-polyester film according to the present invention must have a heat shrinkage (%) higher than 30% in at least one direction of longitudinal and transverse directions in 90° C. hot water. If the heat shrinkage (%) is lower than 30%, the covering material will be often loosen upon the covering of vessels due to too low shrinkage.

The heat-shrinkable co-polyester film of the present invention has a maximum shrinkage stress lower than 3 kg/mm$^2$. If the maximum shrinkage stress exceeds 3 kg/mm$^2$, the thermal treatment of the shrinkable film covered on plastic vessels can result in the deformation of the vessels. For this reason, it is preferred that the heat-shrinkable co-polyester film of the present invention has the lowest possible shrinkage stress.

The heat-shrinkable co-polyester film having excellent crystallinity according to the present invention contains more than 90 mol % of dimethylterephthalate or terephthalic acid as a dicarbonic acid component, 30–94 mol % of ethylene glycol, 3–40 mol % of 1,4-cyclohexanedimethanol and 3–30 mol % of other components, as diol components. This co-polyester film is characterized in that it has a crystallization temperature of 80–220° C., a heat shrinkage (%) higher than 30% in at least one direction of longitudinal and transverse directions in 90° C. hot water, and a maximum shrinkage stress lower than 3 kg/mm$^2$.

The heat-shrinkable polyester film composition contains more than 90 mol % of dimethylterephthalate or terephthalic acid as a dicarbonbic acid component and 0–10 mol % of one component selected from the group consisting of isophthalic acid, 2,6-napthalenedicarboxylic acid, sebacic acid, adipic acid, diphenyldicarboxylic acid, 5-tert-butyl isophtalic acid, 2,2,6,6-tetramethyldiphenyl-4,4'-dicarbonic acid, 1,1,3-trimethyl-3-phenylindan-4,5-dicarbonic acid, 5-sodium sulfoisophthalic acid, trimellitic acid, oxalic acid, malonic acid, succinic acid, glutaric acid, pimeric acid, azelaic acid, pyromellitic acid, 1,4-cyclohexane dicarboxylic acid, 1,3-cyclohexane dicarboxylic acid and an ester compound thereof. Also, it contains 30–94 mol % of ethylene glycol and 3–40 mol % of 1,4-cyclohexanedimethanol and 3–30 mol % of other components, as diol components. As the other diol components, there can be used one or more components selected from neopentyl glycol, diethylene glycol, triethylene glycol, hexanediol, petanediol, diols of 2,2-(4-oxyphenol)propane derivatives, xylene glycol, propanediol, butanediol, 1,3-cyclohexanedimethanol, 2,2-bis-(4-hydroxyphenol)propane, bis(4-hydroxyphenyl)sulfone, polytetramethylene glycol, and polyethylene glycol. In addition to the components as described above, the heat-shrinkable polyester film may also contain other comonomers as long as they do not affect the characteristics of the polyester film.

If the polyester film contains more than 90 mol % of dimethylterephthalate or terephthalic acid as a dicarbonic acid component according to the present invention, a co-polyester film having excellent mechanical properties can be obtained. Moreover, it preferably contains 1,4-cyclohexanedimethanol as a diol component at the amount of 3–40 mol %, and more preferably 10–30 mol %. If the content of 1,4-cyclohexanedimethanol exceeds 40 mol %, coating of the polyester film on plastic vessels can result in the deformation of the vessels. If the content of 1,4-cyclohexanedimethanol is lower than 3 mol %, the resulting polyester film can be unsuitable for use as a product. Furthermore, it preferably contains about 3–30 mol % of the other diol components. If the content of the other diol components exceeds 30 mol %, there is a risk that the necessary properties of the resulting heat-shrinkable polyester film can be remarkably changed.

Thus, the heat-shrinkable polyester film of the present invention preferably contains less than 30 mol % of the other diol components for a special function, i.e., for the purpose of preventing the breakage of a label caused by end lifting, reductions in natural shrinkage or impact.

The 1,4-cyclohexanedimethanol co-polyester which is used in the practice of the present invention can be produced according to the conventional method for the production of polyester.

For example, the 1,4-cyclohexanedimethanol co-polyester can be produced by the direct esterification of terephthalic acid with ethylene glycol and 1,4-cyclohexanedimethanol, the ester interchange of dimethylterephthalate with ethylene glycol and 1,4-cyclohexanedimethanol, and the blending of commercially available co-polyester containing about 30 mol % of 1,4-cyclohexanedimethanol with polyethylene terephthalate.

If necessary, the heat-shrinkable polyester film according to the present invention may contain a lubricant, such as titanium dioxide, silica, kaolin, calcium carbonate, alumina, zicornia and organic particles, and also a thermal stabilizer, an antioxidant, a peening improver, an UV-blocking agent, an antibiotic agent, an antistatic agent, and a flame retardant, etc.

The present invention will hereinafter be described in further detail by examples and comparative examples. It should however be borne in mind that the present invention is not limited to or by the examples. Moreover, properties of films produced in examples and comparative examples were evaluated according to the following method.

(1) Heat Shrinkage (%)

A heat-shrinkable film was sampled by cutting into a square which is 100 mm in length and 100 mm in width. The sample was thermally treated in 90° C. hot water for 10 seconds and measured for its shrinkage (%). The thermal treatment and measurement were repeated 20 times, and an average of the measured values was defined as heat shrinkage (%). The heat shrinkage (%) was calculated according to the following equation.

$$\text{Shrinkage (\%)} = \frac{(100-L)}{100} \times 100$$

(2) Melting Temperature (1st Tm)

About 5 mg of the sample was cut, put in a sample pen, sealed with a press, and then inserted in a sample tray. The maximum of an endothermic peak appearing when heating the sample from 25° C. to 280° C. at a rate of 10° C./minute with a differential scanning calorimeter (DSC) manufactured by Texas Instruments, Inc. was taken as melting temperature.

(3) Crystallization Temperature (2nd Tc)

About 5 mg of the sample was cut, put in a sample pen, sealed with a press, and then inserted in a sample tray. The sample was heated from 25° C. to 280° C. at a rate of 10° C./minute with a differential scanning calorimeter (DSC) manufactured by Texas Instruments, Inc. to erase all the heat history of the heat-shrinkable co-polyester film, and then quenched to room temperature. The maximum of an exothermic peak appearing when re-heating the sample from 25° C. to 280° C. at a rate of 10° C./minute was taken as crystallization temperature.

(4) Intrinsic Viscosity (I.V.)

The sample was completely dissolved in an orthochlorophenol (OCP) solvent to a concentration of 0.0596 wt %, and then measured for its intrinsic viscosity at 25° C. with an autoviscometer (Canon viscometer) manufactured by Design Scientific, Co.

(5) Aging Shrinkage (%)

A heat-shrinkable film was sampled by cutting into a square which is 100 mm in length and 100 mm in width. The sample was left to stand at 40° C. and 70% humidity for 7 days, and then measured for its aging shrinkage (%).

(6) Maximum Shrinkage Stress

The heat-shrinkable polyester film was cut into a size of 150 mm (length as a main shrinkage direction)×15 mm (width) to obtain a sample. The sample was marked with a 100 mm marking line, and positioned between the upper and lower jacks of an Instron mechanical tester (Model No. 5564) set to 100 mm. Then, it was treated in hot air of 90±5° C. for 3 minutes during which the maximum of shrinkage stress was measured to determine the maximum shrinkage stress.

SYNTHETIC EXAMPLE 1

2,000 kg of dimethylterephthalate and 1,278 kg of ethylene glycol were introduced into a reaction tube, and then manganese acetate was added at the amount of 0.08 wt % relative to the amount of dimethylterephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethylterephthalate. After 5 minutes, antimony trioxide was added at the amount of 0.03 wt % relative to the amount of dimethylterephthalate and then continued to stir for 5 minutes. After the oligomeric mixture was transferred to another reactor equipped with a vacuum system, its temperature was elevated from 250° C. to 280° C., thereby obtaining polyethylene terephthalate (PET) having an intrinsic viscosity of 0.6 dl/g.

SYNTHETIC EXAMPLE 2

2,000 kg of dimethylterephthalate and 1,568 kg of 1,3-propanediol were introduced into a reaction tube, and then manganese acetate was added at the amount of 0.08 wt % relative to the amount of dimethylterephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethylterephthalate. After 5 minutes, antimony trioxide was added at the amount of 0.04 wt % relative to the amount of dimethylterephthalate, and after 10 minutes, tetrabutyltitanate was added at the amount of 0.005 wt % relative to the amount of dimethylterephthalate and then the mixture was continued to stir for 5 minutes. After the oligomeric mixture was transferred to another reactor equipped with a vacuum system, its temperature was elevated from 250° C. to 280° C., thereby obtaining polyethylene terephthalate (PTT) having an intrinsic viscosity of 1.0 dl/g.

SYNTHETIC EXAMPLE 3

2,000 kg of dimethylterephthalate, 1,856 kg of 1,4-butanediol, 750 g of tetrabutyltitanate, 150 g of hydrated monobutyltin oxide, 2,500 g of sodium 2,2'-methylenebis-(4,6-di-tert-butylphenyl)phosphate and 1,250 g of Iganox 1010 (Ciba-Geigy) were introduced into a reaction tube. The mixture was heated slowly to 240° C. with the removal of generated methanol. At the end of the ester interchange reaction, 225 g of lithium acetate and 750 g of tetrabutyltitanate were added. After the mixture was transferred to another reactor equipped with a vacuum system, its temperature was elevated from 250° C. to 280° C., thereby obtaining polybutylene terephthalate (PBT) having an intrinsic viscosity of 0.83 dl/g.

SYNTHETIC EXAMPLE 4

1,000 kg of dimethylterephthalate, 553 kg of ethylene glycol and 145 kg of neopentylglycol were introduced into a reaction tube. And manganese acetate was added at the amount of 0.08 wt % relative to the amount of dimethylterephthalate. The mixture was heated slowly to 240° C. with the removal of generated methanol. At the end of the ester interchange reaction, trimethyl phosphate as a thermal stabilizer was added at the amount of 0.03 wt % relative to the amount of dimethylterephthalate. After 5 minutes, antimony trioxide was added at the amount of 0.03 wt % relative to the amount of dimethylterephthalate and continued to stir for 5 minutes. After the oligomeric mixture was transferred to another reactor equipped with a vacuum system, its temperature was elevated from 250° C. to 280° C., thereby obtaining neopentylglycol co-polyester having an intrinsic viscosity of 0.6 dl/g. In this co-polyester, neopentylglycol forms 18 mol % of total diols.

EXAMPLE 1

Polyethylene terephthalate (PET), polytrimethylene terephthalate (PTT), and commercially available cyclohexanedimethanol co-polyester (PETG) containing 30 mol % of 1,4-cyclohexanedimethanol were introduced into the respective raw material feeders. Then, while adjusting the inputs of the raw materials with the respective feeders in such a manner that the polyethylene terephthalate (PET) is 40 wt %, the polytrimethylene terephthalate (PTT) is 10 wt % and the cyclohexanedimethanol co-polyester (PETG) is 50 wt %, these raw materials were continuously introduced into a twin-screw extruder capable of melting and extruding the raw materials with the removal of water in high vacuum levels. The resulting sheet melted and extruded through the twin-screw extruder and T-die was solidified on a chill casting roll. The solidified sheet was preheated to 90–110° C., and drawn to 3.5 times in a transverse direction at 80–100° C., thereby producing a heat-shrinkable polyester film having a thickness of 50 μm.

EXAMPLE 2

Polyethylene terephthalate (PET), polybutylene terephthalate (PBT), and commercially available cyclohexanedimethanol co-polyester (PETG) containing 30 mol % of 1,4-cyclohexanedimethanol were introduced into the respective raw material feeders. Then, while adjusting the inputs of the raw materials with the respective feeders in such a manner that the polyethylene terephthalate (PET) is 40 wt %, the polybutylene terephthalate (PBT) is 10 wt % and the cyclohexanedimethanol co-polyester (PETG) is 50 wt %, these raw materials were continuously introduced into a twin-screw extruder capable of melting and extruding the raw materials with the removal of water in high vacuum levels. The resulting sheet melted and extruded through the twin-screw extruder and T-die was solidified on a chill casting roll. The solidified sheet was preheated to 90–110° C., and drawn to 4.0 times in a transverse direction at 80–100° C., thereby producing a heat-shrinkable polyester film having a thickness of 50 μm.

COMPARATIVE EXAMPLE 1

Polytrimethylene terephthalate (PTT) and neopentylglycol co-polyester were pre-crystallized, and then the resulting chips were introduced into rotary vacuum drier in such a manner that the polytrimethylene terephthalate (PTT) is 11 wt % and the neopentylglycol co-polyester is 89 wt %. The dried mixture was melted and extruded through a single-screw extruder, and the resulting sheet was solidified on a chill casting roll. The solidified sheet was preheated to 90–110° C., and drawn to 4.0 times in a transverse direction at 80–100° C., thereby producing a heat-shrinkable polyester film having a thickness of 50 μm.

COMPARATIVE EXAMPLE 2

Polyethylene terephthalate (PET) and commercially available cyclohexanedimethanol co-polyester (PETG) containing 30 mol % of 1,4-cyclohexanedimethanol were introduced into the respective raw material feeders. Then, while adjusting the inputs of the raw materials with the respective feeders in such a manner that the polyethylene terephthalate (PET) is 33 wt % and the cyclohexanedimethanol co-polyester (PETG) is 67 wt %, these raw materials were continuously introduced into a twin-screw extruder capable of melting and extruding the raw materials with the removal of water in high vacuum levels. The resulting sheet melted and extruded through the twin-screw extruder and T-die was solidified on a chill casting roll. The solidified sheet was preheated to 90–110° C., and drawn to 4.0 times in a transverse direction at 80–100° C., thereby producing a heat-shrinkable polyester film having a thickness of 50 μm.

The measured properties of the films produced by Examples and Comparative Examples are given in Table 1 below.

TABLE 1

| Properties | | Example 1 | Example 2 | Comparative Example 1 | Comparative Example 2 |
|---|---|---|---|---|---|
| Heat shrinkage (%) | Longitudinal direction | 2 | 2 | 3 | 5 |
| | Transverse direction | 62 | 53 | 50 | 67 |
| 1st Tm (° C.) | | 242 | 242 | 204 | 235 |
| 2nd Tc (° C.) | | 173 | 178 | — | — |
| Maximum shrinkage stress (kg/mm$^2$) | | 0.58 | 0.44 | 3.13 | 3.54 |
| Aging shrinkage (%) | | 0.3 | 0.3 | 1.0 | 1.2 |

Furthermore, FIG. 1 shows the result of differential scanning calorimetry (DSC) for the heat-shrinkable polyester film produced by Example 1.

As described above, the heat-shrinkable polyester film according to the present invention does not cause a fusion phenomenon even if co-polyester is not pre-crystallized. Moreover, this film shows reduced thermal decomposition upon recycling and exhibits insignificant aging even upon long-term storage. Thus, this film is suitable for use as various wrapping materials, such as covering, binding and casing materials. Particularly, this film is used to cover a cap, body and shoulder, etc. of various vessels and rod-shaped molded articles and thus to provide labeling, protection, binding or an improvement in product value.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method for producing a heat-shrinkable co-polyester film having terephthalic acid and ethylene glycol as main components and containing 1,4-cyclohexanedimethanol at the amount of 3–40 mol %, comprising the steps of:

introducing raw materials comprising 1,4-cyclohexanedimethanol co-polymer (PETG), polyethylene terephthalate (PET), and polybutylene terephthalate (PBT) synthesized from said terephthalic acid, ethylene glycol and 1,4 cyclohexanedimethanol into raw material feeders without pre-drying or pre-crystallization;

melting and extruding said raw materials with the removal of water at high vacuum levels and then solidifying; and drawing to 2–5 times in a longitudinal or transverse direction, thereby producing the co-polyester film having a crystallization temperature of 80–220° C., a heat shrinkage (%) higher than 30% in at least one direction of longitudinal and transverse directions in 90° C. hot water, and a maximum shrinkage stress lower than 3 kg/mm$^2$.

* * * * *